United States Patent
Chang

(10) Patent No.: US 7,062,754 B2
(45) Date of Patent: Jun. 13, 2006

(54) METHOD FOR TESTING IEEE 1394 CONTROLLERS

(75) Inventor: Yu-Wei Chang, Taipei (TW)

(73) Assignee: Via Technologies, Inc., Taipei (TW)

( * ) Notice: Subject to any disclaimer, the term of this patent is extended or adjusted under 35 U.S.C. 154(b) by 805 days.

(21) Appl. No.: 10/050,574

(22) Filed: Jan. 18, 2002

(65) Prior Publication Data

US 2004/0015738 A1  Jan. 22, 2004

(30) Foreign Application Priority Data

Feb. 7, 2001  (TW) .............................. 90102690 A

(51) Int. Cl.
  *G06F 9/44* (2006.01)
(52) U.S. Cl. ..................... 717/124; 717/126; 700/3; 709/209
(58) Field of Classification Search ................ 714/724, 714/25, 33; 717/125, 100; 370/242
  See application file for complete search history.

(56) References Cited

U.S. PATENT DOCUMENTS 4,907,230 A * 3/1990 Heller et al. ................ 714/724
6,665,268 B1 * 12/2003 Sato et al. ................... 370/242
6,775,824 B1 * 8/2004 Osborne et al. ............. 717/125

OTHER PUBLICATIONS

Wikipedia Encyclopedia (website: answers.com): description of "controllers", 1 page.*
Microsoft Computer Dictionary, Fifth Edition, p. 18, definition of "interface card", 1 page.*

* cited by examiner

*Primary Examiner*—Tuan Dam
*Assistant Examiner*—Thuy Dao
(74) *Attorney, Agent, or Firm*—Rabin & Berdo, P.C.

(57) ABSTRACT

A method for performing a load flow test among a number of IEEE 1394 controllers is provided. The IEEE 1394 controllers are disposed on a number of interface cards individually while the interface cards are placed in a host or several hosts. The method includes the following steps: The interface cards are first initialized. Then, the master interface card starts to perform the load flow test. After that, the status of every interface cards is checked for confirming whether an error occurs or not. If the error occurs, debugging is performed. If not, the slave interface cards checks the result of the load flow test. The invention can fully control the buffer and monitor the memory since the test method is not performed under the driver structure in the WINDOWS operating system. It is therefore convenient to test in a load flow environment by using this method.

7 Claims, 5 Drawing Sheets

METHOD FOR TESTING IEEE 1394 CONTROLLERS

This application incorporates by reference Taiwanese application Serial No. 090102690, Filed Feb. 7, 2001.

BACKGROUND OF THE INVENTION

1. Field of the Invention

The invention relates in general to a method for testing 1394 controllers, and more particularly to a method for testing 1394 controllers in a multiple system.

2. Description of the Related Art

Within the field of computer application nowadays, information is commonly shared or transmitted between two apparatus, such like two hosts, a host and a peripheral, or two peripherals. The larger the file size is, the more time for transmission is required. It takes a long time to transmit a file with large size by a lower transmission standard and brings users inconvenience to use.

It is therefore urgent to require a transmission standard supporting high-speed data transmission. As far as the transmission standard in common use is concerned, IEEE 1394 provides an advanced solution for the high-speed transmission and becomes highly valued. The IEEE 1394 standard is also known as the ILINK or FIREWIRE standard.

After finishing the design of the interface card with a 1394 controller, the interface card has to be put to the general test and the load flow test to ensure its performance. The test methods presently used are performed under the driver structure in Microsoft's WINDOWS System. The packet of the 1394 standard is generated by the test method and received by the interface card to ensure its normalization.

However, the drawback of the test method is that it is hard to debug during the load flow test. The load flow test is to send out a large amount of packets to the interface card in a very short time for testing the stability of the interface card. The driver under the WINDOWS operating system needs an additional debug program, SoftICE of NuMega company for example, to check the values inside the computer memory and the buffer. It is hard to perform debugging for the test worker since the memory address in the Microsoft's WINDOWS System is a virtual address, which requires a transformation for mapping onto the physical address. It is also hard to trace the wrong packet while problem causing. Besides, it is not easy to monitor the testing status at every moment due to the difficulties of observing the buffer and memory and the inconvenience of changing the buffer setting.

SUMMARY OF THE INVENTION

It is therefore an object of the invention to provide a method for testing interface cards with IEEE 1394 controllers. The method can be performed in a multiple system and it is not restricted to use in the WINDOWS operating system.

It is another object of the invention to provide a method for testing interface cards with IEEE 1394 controllers. It can fully control the buffer and is convenient to test in a load flow environment by using this method.

It is the other object of the invention to provide a method for testing interface cards with IEEE 1394 controllers. The packet of 1394 standard is easily generated by the test method and received by the interface card for automatically checking the test result. Besides, the invention can detect and find out what the problem is by monitoring the buffer during the test. Further, it can easily maintain and add new functions to the test method according to the invention.

The invention achieves the above-identified objects by providing a method for performing a load flow test among a number of IEEE 1394 controllers. The IEEE 1394 controllers are disposed on a number of interface cards individually while the interface cards are placed in a host or several hosts. The method includes the following steps: The interface cards are first initialized. One of the interface cards is set as a master interface card and the other interface cards are set as slave interface cards. Then, the master interface card initializes a number of communication protocol packets while each slave interface card sends a first ready signal. The master interface card sends the communication protocol packets to the slave interface cards for responding to the first ready signals. The slave interface cards then send a number of second ready signals individually for responding to the communication protocol packets sent by the master interface card. After that, the master interface card starts to perform the load flow test for responding to the second ready signals. After checking the status of every interface cards, the master interface card sends a number of check packets to the slave interface cards; meanwhile, debugging is performed if any error occurs before sending. The slave interface cards then send a number of third ready signals individually for responding to the check packets. After that, the master interface card sends a number of confirm signals to the slave interface cards for responding to the third ready signals. Finally, the slave interface cards checks the test results for responding to the confirm signals.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

Figure 1A:
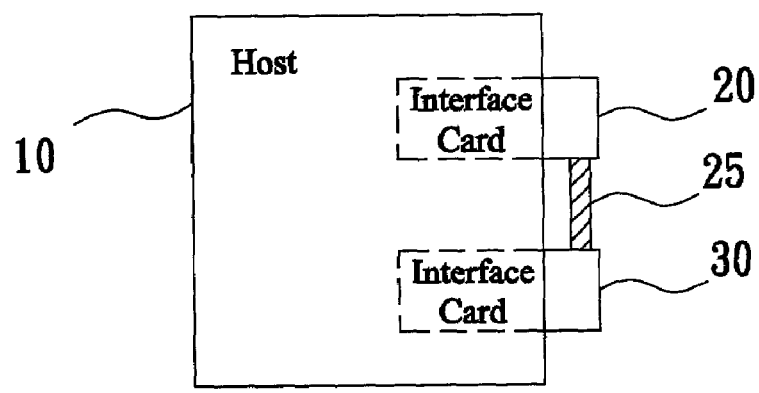
FIG. 1A-1B illustrates two environments to which the preferred embodiment of the invention is applied.
Figure 1B:
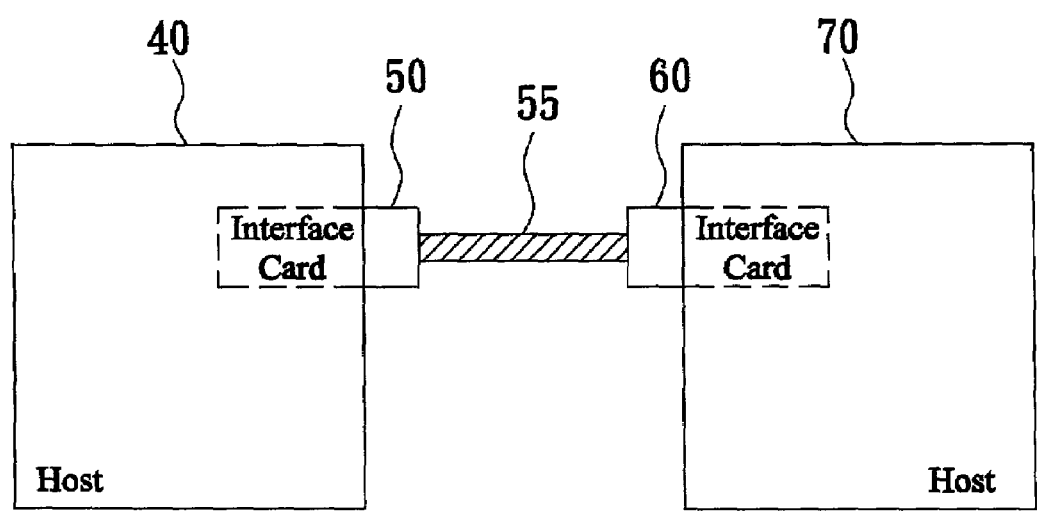

This invention is used to put several 1394 controllers to the load flow test. The 1394 controllers are disposed on interface cards individually. The interface cards can be placed in one or several hosts. Referring to FIG. 1A and 1B, two environments to which the preferred embodiment of the invention is applied are illustrated. As shown in FIG. 1A, the test method according to the invention is applied to a single system. The single system includes a host 10 and interface cards 20 and 30 placed in the host 10. The interface card 20 is connected with the interface card 30 by the cable 25. As shown in FIG. 1B, the test method according to the invention is applied to a multiple system. The multiple system includes two systems. One system consists of a host 40 and an interface card 50. The other system consists of a host 70 and an interface card 60. Besides, the interface card 50 is connected with the interface card 60 by the cable 55. The invention is not restricted to be applied to environments as shown in FIG. 1A and FIG. 1B, as it can also be applied to the a multiple environment consisting of several interface cards placed in a host or a multiple environment consisting of several interface cards placed in several hosts.

The prerequisite of the invention is that all the interface cards to be tested work are in a normal flow condition. The purpose of this invention is providing a method for testing if all the interface cards normally work in a load flow environment.

The embodiment of the test method is developed in the MS-DOS (Microsoft Disk Operating System) in order to avoid the test method being restricted to use in the WINDOWS operating system.

Figure 2A:
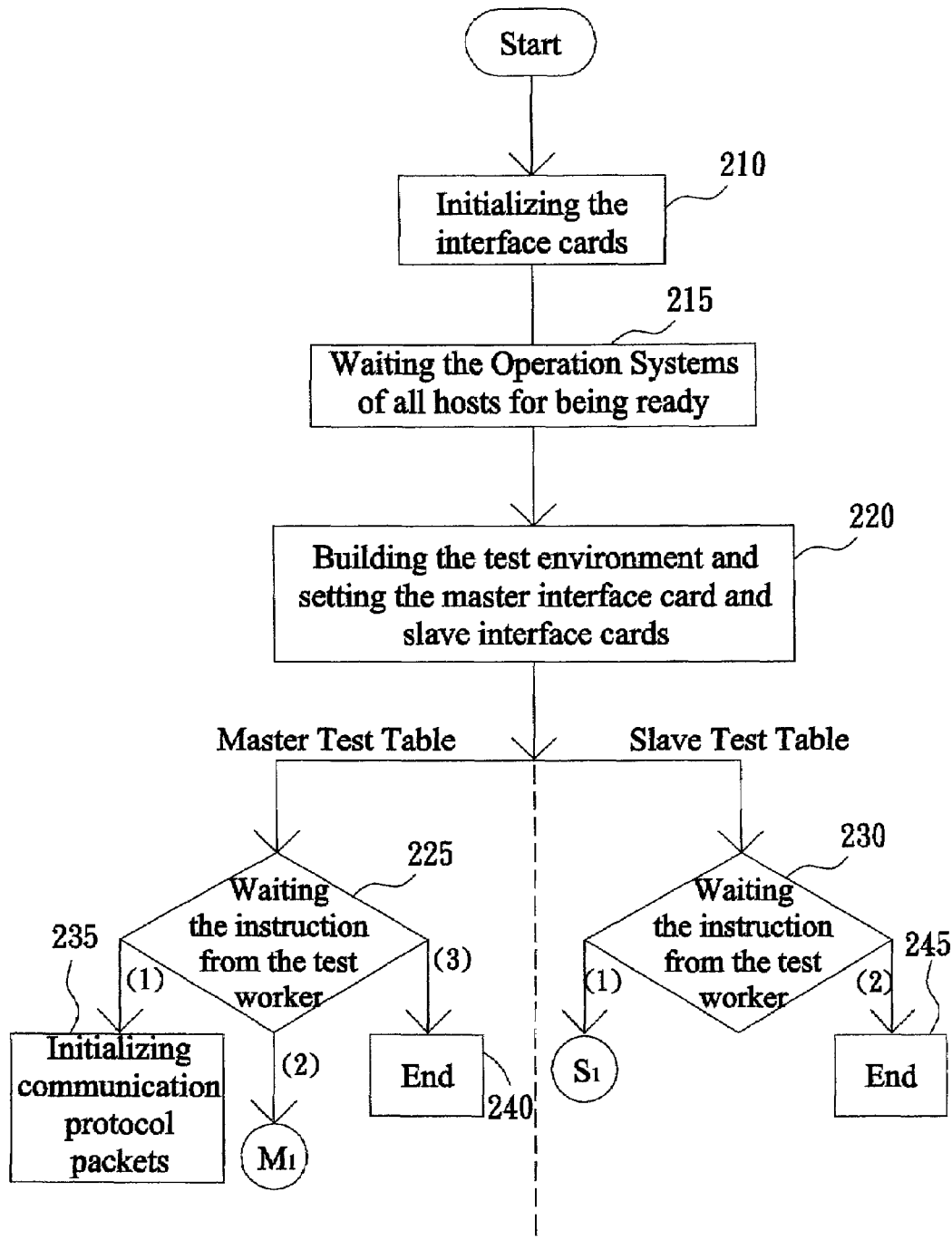
FIG. 2A-2D shows a flowchart of the test method according to the preferred embodiment of the invention.

As shown in FIG. 2A to 2D, the flowchart of the test method according to the preferred embodiment of the invention is shown. Referring first to FIG. 2A, it starts to initialize the interface cards to be tested and allocate memory in step 210. Since there might be several hosts for building the test environment as shown in FIG. 1B, the operating systems of all the hosts are held in a waiting state for being ready in step 215 to proceed with the procedure. In the next step 220, all the interface cards to be tested have to communicate one another for building a test environment. After successfully building the test environment by using all the communication data, one of the interface card is selected as a master interface card and the other interface cards are the slave interface cards. The way to choose the master/slave interface cards is known by the skilled person in the art and thus omitted without further description. Subsequently, the master interface card and the slave interface cards proceeds to perform different test procedures. As shown in FIG. 2A to 2D, there are dotted line for separating two test procedures. The left one is the test procedure of the master interface card while the right one is the test procedure of the slave interface card. The master interface card and the slave interface card proceed to the master test table and the slave test table respectively and await the instruction from the test worker as shown in step 225 and 230.

The master test table includes three choices: (1) initializing communication protocol packets; (2) performing the test; (3) end. It enters step 235 when the test worker chooses to initialize communication protocol packets according to the (1) choice in the master test table. It enters M1 node when the test worker chooses to performing the test according to the (2) choice in the master test table. It enters step 240 and concludes the test procedure of the master interface card when the test worker chooses the end according to the (3) choice in the master test table.

In step 235, the communication protocol packets are initialized according to the following three modes: a command mode, edit mode, and random mode. The communication protocol packets are generated by a predetermined command file in the command mode. The communication protocol packets are generated by the key-in content from the test worker in the edit mode. The communication protocol packets are generated at random in the random mode. After initializing the communication protocol packets, it returns to step 225.

The slave test table includes two choices: (1) performing the test; (2) end. It enters step 245 and concludes the test procedure when the test worker chooses the end according to the (2) choice in the slave test table. It enters S1 node and proceeds with the subsequent steps when the test worker chooses to perform the test according to the (1) choice in the slave test table.

Figure 2B:
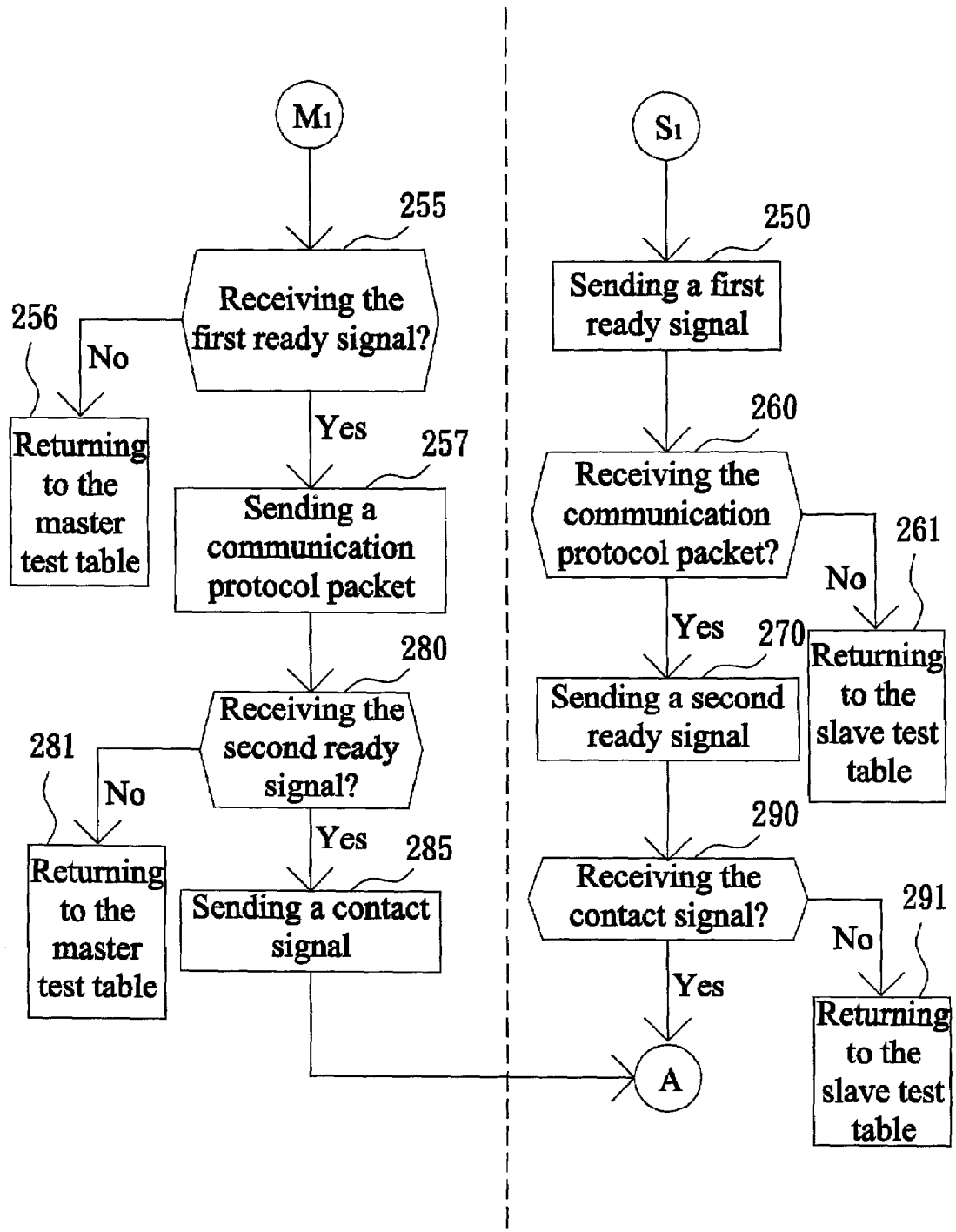

As shown in FIG. 2B, the slave interface card sends a first ready signal to the master interface card in step 250. Later in step 255, the master interface card detects whether or not it receives the first ready signal from the slave interface card in a set period. If the first ready signal is received, it enters to step 257 and the master interface card sends the communication protocol packet to the slave interface card. If not, it returns to the master test table as shown in step 256. This means some errors occur and the test worker has to debug.

In step 260, the slave interface card detects whether or not it receives the communication protocol packet in a set period. If the communication protocol packet is received, it enters to step 270 and the slave interface card sends the second ready signal to the master interface card. If not, it returns to the slave test table as shown in step 261. Similarly, this means some errors occur and the test worker has to debug.

In step 280, the master interface card detects whether or not it receives the second ready signal from the slave interface card in a set period. If the second ready signal is received, it enters to step 285 and the master interface card sends contact signals to all the slave interface card and starts to perform the load flow test. If second ready signal is not received, it returns to the master test table as shown in step 281. This means some errors occur and the test worker has to debug.

Meanwhile, the slave interface card detects whether or not it receives the contact signal from the master interface card in a set period. If the contact signal is not received, it returns to the slave test table as shown in step 291. This also means some errors occur and the test worker has to debug. If the contact signal is received, it enters to A node.

Figure 2C:
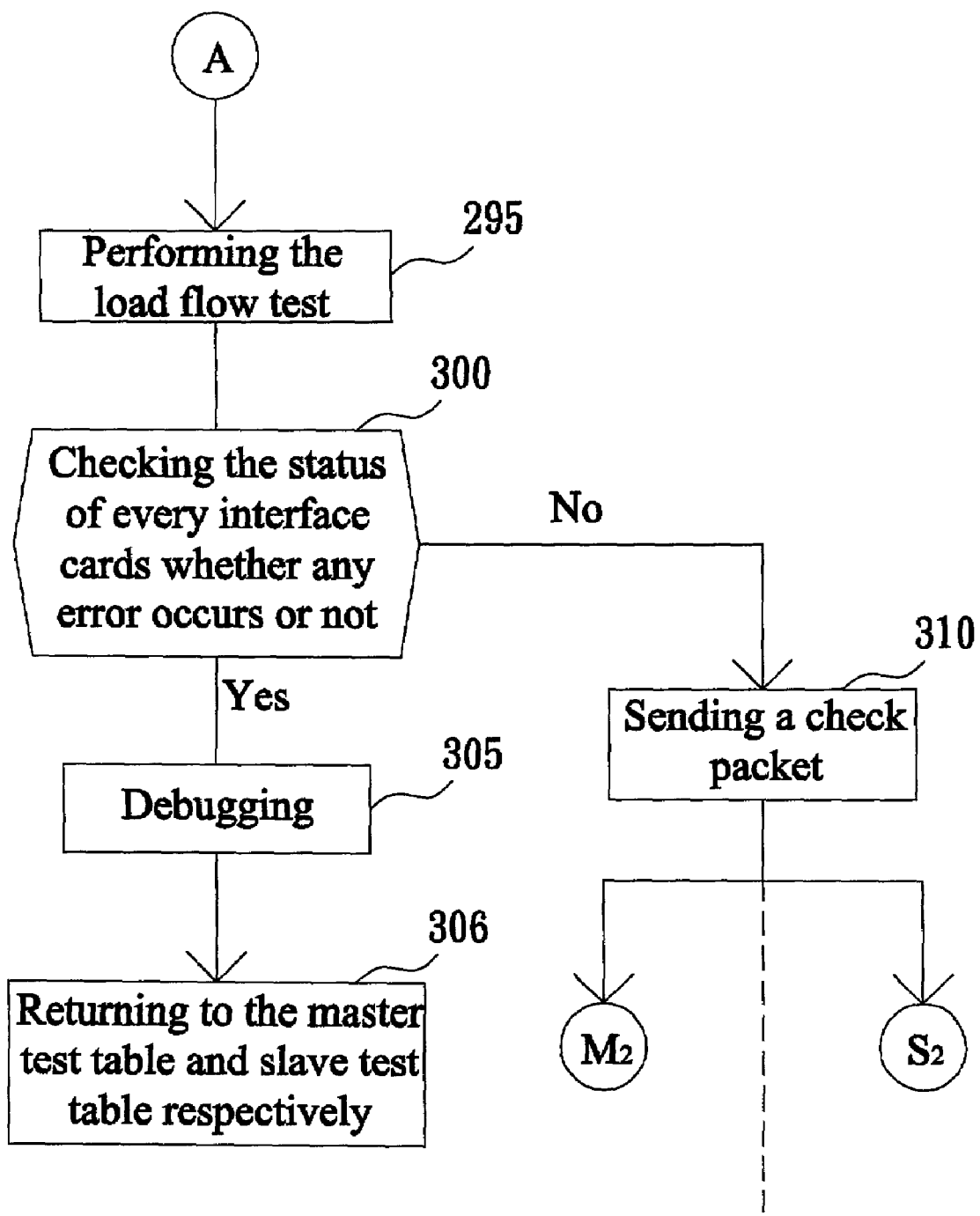

Referring to FIG. 2C, the slave interface card starts to perform the load flow test after receiving the contact signal from the master interface card. That is, all the interface cards, including the master interface card and the slave interface card, perform the load flow test in step 295. A large number of packets are transmitted among interface cards and it waits to complete the command instructed by the packets. For example, the command might be an instruction of reading or writing the data from the memory of some interface card or a host. In the next step 300, the status of every interface card is checked.

If any error has occurred, not only the debugging is performed but also the system needs rebuilding in step 305. After that, in step 306, the master interface card and the slave interface card return to the master test table and the slave test table respectively. As shown in step 310, if no error has occurred, the master interface card sends check packets to the slave interface cards for the preparation of checking the test results, such as the transmission speed of packets. In step 310, the master interface card proceeds to the M2 node and the slave interface card proceeds to the S2 node.

Figure 2D:
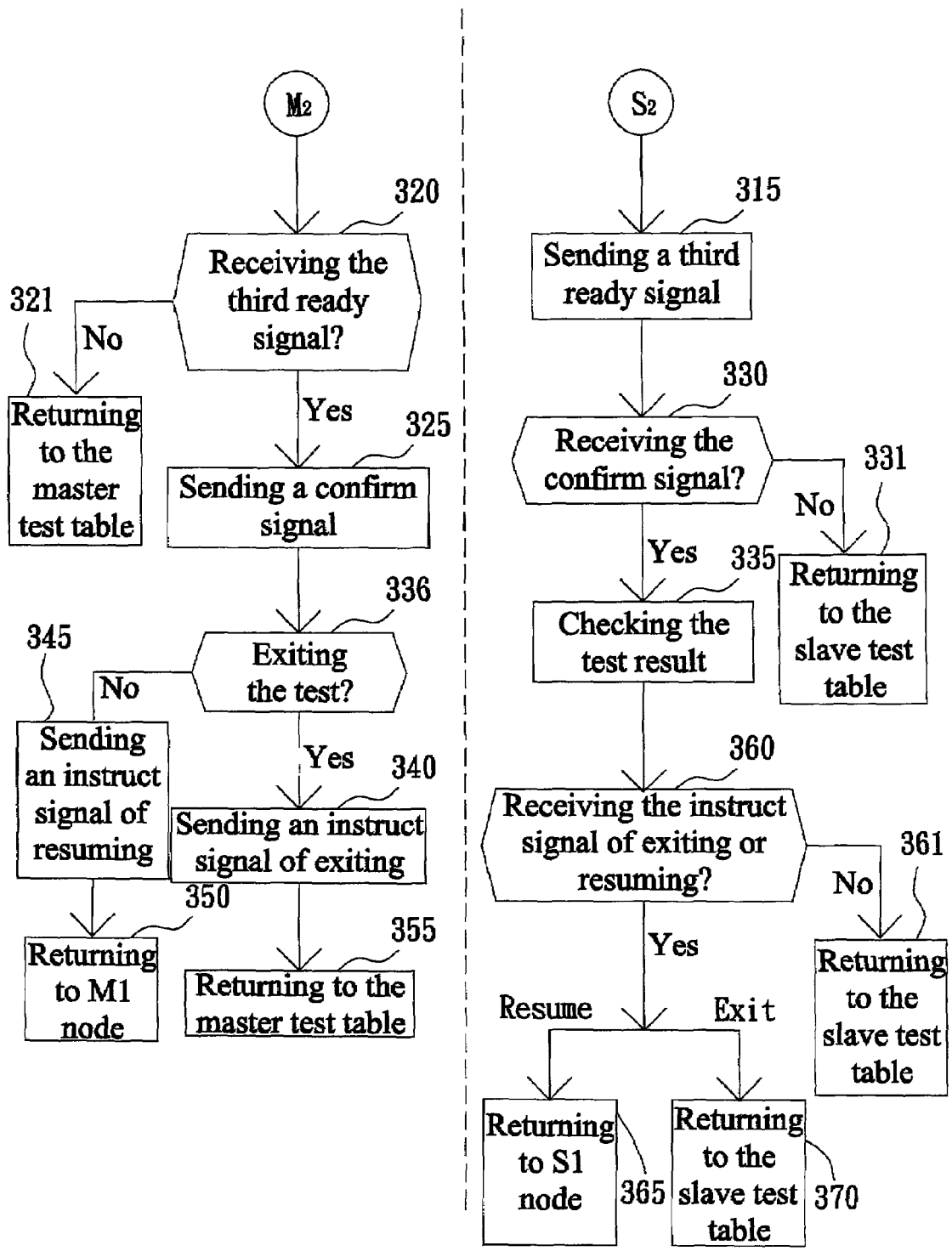

Referring to FIG. 2D, in step 315, the slave interface card sends the third ready signal to the master interface card for responding to the check packets. In step 320, the master interface card detects whether or not it receives the third ready signal from the slave interface card in a set period. If the third ready signal is received, it enters to step 325 and the master interface card sends confirm signals to all the slave interface cards. If the third ready signal is not received, it returns to the master test table as shown in step 321. This means some errors occur in the testing procedure.

Meanwhile, in step 330, the slave interface card detects whether or not it receives the confirm signal from the master interface card in a set period. If the confirm signal is not received, it returns to the slave test table as shown in step 331. If the confirm signal is received, the slave interface cards check the results of the load flow test in step 335, such as the transmission speed of packets.

In step 336, the master interface card decides whether or not it exits the test. If deciding to exit, the master interface card sends an instruct signal of exiting in step 340 and it returns to the master test table. If deciding not to exit, the master interface card sends instruct signals of resuming to all the slave interface cards in step 345 and then the it returns to the M1 node in FIG. 2B and resumes the test.

As shown in step 360, the slave interface card detects whether it receives the instruct signal from the master interface card to decide either to exit or to resume. If the instruct signal is not received in a set period, it returns to the slave test table in step 361. If the slave interface card receives the instruct signal of exiting, it returns to slave test table. If the slave interface card receives the instruct signal of resuming, it returns to the S1 node of FIG. 2B and resumes the test.

According to the invention, all the acts of returning to the master/slave test table are monitored. However, it is a normal situation if the act is decided by the test worker, such as step 340 and step 370, and it does not mean an error has occurred. Otherwise, it is an abnormal situation if the act is not decided by the test worker. It means some error occurs and the test worker is able to control and solve the problem by debugging.

The method for testing the interface cards with controllers as mentioned above provides the following advantages:

(1) It can fully control the buffer and monitor the memory since the test method is not performed under the driver structure in Microsoft's WINDOWS operating system. Besides, it is convenient to test in a load flow environment by using this method.

(2) The packet of IEEE 1394 standard is easily generated by the test method and received by the interface card for automatically checking the test result.

(3) It can detect and find out what the problem is by monitoring the buffer and memory during the test.

(4) The method can be performed in a multiple system and there is no need to be restricted to use with the WINDOWS operating system.

(5) It can easily maintain and add new functions to the test method according to the invention.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for performing a load flow test among a plurality of IEEE 1394 controllers, wherein said IEEE 1394 controllers are disposed on a plurality of interface cards individually, said method comprising the steps of:
   (a) initializing said interface cards and setting one of said interface cards as a master interface card and the other interface cards as slave interface cards;
   (b) said master interface card initializing a plurality of communication protocol packets while said slave interface cards send a plurality of first ready signals;
   (c) said master interface card sending said communication protocol packets to the slave interface cards for responding to said first ready signals;
   (d) said slave interface card sending a plurality of second ready signals for responding to the communication protocol packets sent by said master interface card;
   (e) said master interface card starting to perform said load flow test for responding to the second ready signals;
   (f) checking status of every interface card for confirming whether an error occurs or not and sending a plurality of check packets to the slave interface cards by said master interface card, wherein debugging is performed if said error occurs;
   (g) said slave interface cards sending a plurality of third ready signal for responding to the check packets;
   (h) said master interface card sending a plurality of confirm signals to said slave interface cards for responding to said third ready signals; and
   (i) said slave interface cards checking said test results for responding to said confirm signals;
   wherein steps (a) to (i) are performed sequentially.

2. The method according to claim 1, wherein said interface cards are placed on at least one host, said step (a) further comprising the steps of:
   (a1) initializing said interface cards;
   (a2) waiting an operating system of said host being ready; and
   (a3) building a test environment for said interface cards to communicate with one another.

3. The method according to claim 2, wherein said operating system of said host is Microsoft Disk Operating System (MS-DOS).

4. The method according to claim 1, wherein said communication protocol packet is built by a command file mode, edit mode, or random mode.

5. A method for performing a load flow test between a master interface card and a slave interface card, said method comprising the steps of:
   (a) initializing said master interface card and said slave interface cards and building a test environment;
   (b) said master interface card initializing a communication protocol packet;
   (c) said master interface card sending said communication protocol packets for responding to a first ready signal from said slave interface card;
   (d) said slave interface card sending said ready signal again for responding to said communication protocol packet;
   (e) said master interface card starting to perform said load flow test for responding to said ready signal in step (d) and checking said status of every interface card for confirming whether an error occurs or not;
   (f) debugging if any error occurs in step (e) and rebuilding said environment; otherwise sending a check packet;
   (g) said slave interface card sending said ready signal again for responding to said check packet;
   (h) said master interface card sending a confirm signal to said slave interface card for responding to said ready signal;
   (i) said slave interface card checking said test results for responding to said confirm signal; and
   (j) said master interface card sending an instruct signal for deciding either exiting or resuming;
   wherein steps (a) to (i) are performed sequentially.

6. The method according to claim 5, wherein said test environment is Microsoft Disk Operating System (MS-DOS).

7. The method according to claim 5, wherein said communication protocol packet is built by a command file mode, edit mode, or random mode.

* * * * *